(12) United States Patent
Ohta

(10) Patent No.: US 10,160,462 B2
(45) Date of Patent: Dec. 25, 2018

(54) DRIVING SUPPORT APPARATUS

(71) Applicant: DENSO CORPORATION, Kariya, Aichi-pref. (JP)

(72) Inventor: Kazuhide Ohta, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 166 days.

(21) Appl. No.: 15/324,614

(22) PCT Filed: Jul. 6, 2015

(86) PCT No.: PCT/JP2015/003377
§ 371 (c)(1),
(2) Date: Jan. 6, 2017

(87) PCT Pub. No.: WO2016/006219
PCT Pub. Date: Jan. 14, 2016

(65) Prior Publication Data
US 2017/0203769 A1   Jul. 20, 2017

(30) Foreign Application Priority Data
Jul. 10, 2014   (JP) .................. 2014-142441

(51) Int. Cl.
*B60W 50/12* (2012.01)
*B60R 21/00* (2006.01)
(Continued)

(52) U.S. Cl.
CPC ............. *B60W 50/12* (2013.01); *B60R 21/00* (2013.01); *B60W 10/06* (2013.01);
(Continued)

(58) Field of Classification Search
CPC ...... B60W 50/12; B60W 50/14; B60W 10/22; B60W 10/184; B60W 10/06; B60W 30/06;
(Continued)

(56) References Cited

U.S. PATENT DOCUMENTS

2002/0128750 A1* 9/2002 Kakinanni ............. B60Q 9/005
701/1
2004/0153243 A1* 8/2004 Shimazaki ......... B62D 15/0275
701/300

(Continued)

FOREIGN PATENT DOCUMENTS

JP          2012-40938 A        1/2012

*Primary Examiner* — Mary Cheung
(74) *Attorney, Agent, or Firm* — Knobbe, Martens, Olson & Bear LLP

(57) ABSTRACT

A driving support apparatus mounted to a vehicle includes: a parking space identifier that identifies a parking space by using an imaging process based on a captured image taken by an imaging device, which is mounted to the vehicle and takes an image of the surrounding of the vehicle; an overlapping degree identifier that identifies an overlapping degree of the vehicle towards the parking space based on the captured image and the parking space identified by the parking space identifier; and a speed limiter that limits a vehicle speed to be less than or equal to a maximum value, which is predetermined, when the overlapping degree identified by the overlapping degree identifier is larger to or equal to a predetermined value.

9 Claims, 9 Drawing Sheets

(51) Int. Cl.
| | |
|---|---|
| *B60W 30/18* | (2012.01) |
| *B62D 15/02* | (2006.01) |
| *G05D 1/02* | (2006.01) |
| *G06K 9/00* | (2006.01) |
| *B60W 50/14* | (2012.01) |
| *B60W 10/06* | (2006.01) |
| *B60W 10/184* | (2012.01) |
| *B60W 10/22* | (2006.01) |
| *B60W 30/06* | (2006.01) |

(52) U.S. Cl.
CPC .......... *B60W 10/184* (2013.01); *B60W 10/22* (2013.01); *B60W 30/06* (2013.01); *B60W 30/18* (2013.01); *B60W 50/14* (2013.01); *B62D 15/027* (2013.01); *G05D 1/0246* (2013.01); *G06K 9/00812* (2013.01); *B60W 2050/146* (2013.01); *B60W 2420/42* (2013.01); *B60W 2420/52* (2013.01); *B60W 2520/10* (2013.01); *B60W 2520/14* (2013.01); *B60W 2540/18* (2013.01); *B60W 2550/402* (2013.01)

(58) Field of Classification Search
CPC ....... B60W 2420/42; B60W 2050/146; B60W 2550/402; B60W 2520/14; B60W 2520/10; B60W 2420/52; B60W 2420/18; B60W 30/18; G06K 9/00812; G05D 1/0246; B60D 15/027; B60R 21/00
See application file for complete search history.

(56) References Cited

U.S. PATENT DOCUMENTS

| | | | |
|---|---|---|---|
| 2011/0210868 A1* | 9/2011 | Yano | B62D 15/027 340/932.2 |
| 2012/0133248 A1 | 5/2012 | Kusano | |
| 2014/0036076 A1* | 2/2014 | Nerayoff | H04N 7/181 348/148 |

* cited by examiner

DRIVING SUPPORT APPARATUS

CROSS REFERENCE TO RELATED APPLICATION

This application is based on Japanese Patent Application No. 2014-142441 filed on Jul. 10, 2014, the disclosure of which is incorporated herein by reference.

TECHNICAL FIELD

The present disclosure relates to a driving support apparatus for inhibiting sudden acceleration when a vehicle departs from a parking space or when the vehicle moves to the parking space for parking.

BACKGROUND ART

The technology for inhibiting sudden acceleration caused by stepping erroneously between a brake pedal and an acceleration pedal has been known.

For example, Patent Literature 1 discloses an acceleration device that inhibits sudden acceleration by arranging a special cylinder and a hinge metal fitting between an acceleration pedal and an acceleration wire. However, with regard to the technology disclosed in Patent Literature 1, the complexity in the mechanical structure in an existing acceleration device and an increase in number of components and cost for the acceleration device have been an issue.

In response to the above situation, the technology for inhibiting sudden acceleration of a vehicle while reducing complexity in the mechanical structure of an acceleration device has been proposed. For example, Patent Literature 2 discloses the technology that detects an operation for entering a parking space while inhibiting acceleration when the overlapping proportion of the vehicle's estimated track and the entrance of a parking space is equal to or larger than a set value which is computed based on the vehicle's estimated track and the entrance position of the parking space recognized by an image recognition process.

However, since the technology disclosed in Patent Literature 2 does not inhibit sudden acceleration when the vehicle enters the parking space, therefore, the sudden acceleration cannot be inhibited when the vehicle departs beginning from a state in which the vehicle stops at the parking space.

PRIOR ART LITERATURES

Patent Literature

Patent Literature 1: JP 2012-40938A
Patent Literature 2: JP 2013-49425A

SUMMARY OF INVENTION

It is an object of the present disclosure to provide a driving support apparatus that inhibits sudden acceleration when departing from a parking space while reducing complexity of the mechanical structure in an acceleration device.

A driving support apparatus mounted to a vehicle according to an aspect of the present disclosure includes: a parking space identifier that identifies a parking space by using an imaging process based on a captured image taken by an imaging device, which is mounted to the vehicle and takes an image of the surrounding of the vehicle; an overlapping degree identifier that identifies an overlapping degree of the vehicle towards the parking space based on the captured image and the parking space identified by the parking space identifier; and a speed limiter that limits a vehicle speed to be less than or equal to a maximum value, which is predetermined, when the overlapping degree identified by the overlapping degree identifier is larger to or equal to a predetermined value.

Accordingly, when one part of vehicle is included in a captured image taken by the imaging device mounted to a vehicle, since the positional relation between the parking space and the vehicle which is identified by using an imaging process based on the captured image, it is also possible to identify an overlapping degree towards the vehicle's parking space. In addition, even when a part of the vehicle is not included in the captured image, since it is possible to identify the positional relation between the parking space, which is specified by using an imaging process based on the captured image, and the vehicle from the mounting position of the imaging device towards the vehicle; therefore, the overlapping degree towards the vehicle's parking space can be identified. Accordingly, the overlapping degree towards the vehicle's parking space can be identified by the overlapping degree identifier.

According to the above-mentioned driving support apparatus, when the overlapping degree towards the vehicle's parking space which is identified by the overlapping degree identifier is larger than or equal to the predetermined value, the vehicle's speed is limited to be less than or equal to the predetermined maximum value. Accordingly, even when the vehicle parking at the parking space departs; and the vehicle enters into the parking space at the time of parking towards the parking space, the vehicle's speed is limited less than or equal to the predetermined maximum value. Therefore, it is possible to inhibit sudden acceleration at the time of departing from the parking space or entering into the parking space. In addition, according to the driving support apparatus, the processes carried out by the parking space identifier, the overlapping degree identifier, and the speed limiter can be carried out by an electronics circuit such as a CPU; therefore, it is not needed to add a component to an acceleration device. As a result, it is possible to reduce the complexity of mechanical structure in the acceleration device while inhibiting sudden acceleration when departing from the parking space.

EMBODIMENTS FOR CARRYING OUT INVENTION (First Embodiment)

<The Schematic Configuration of a Driving Support System 100>

Figure 1:
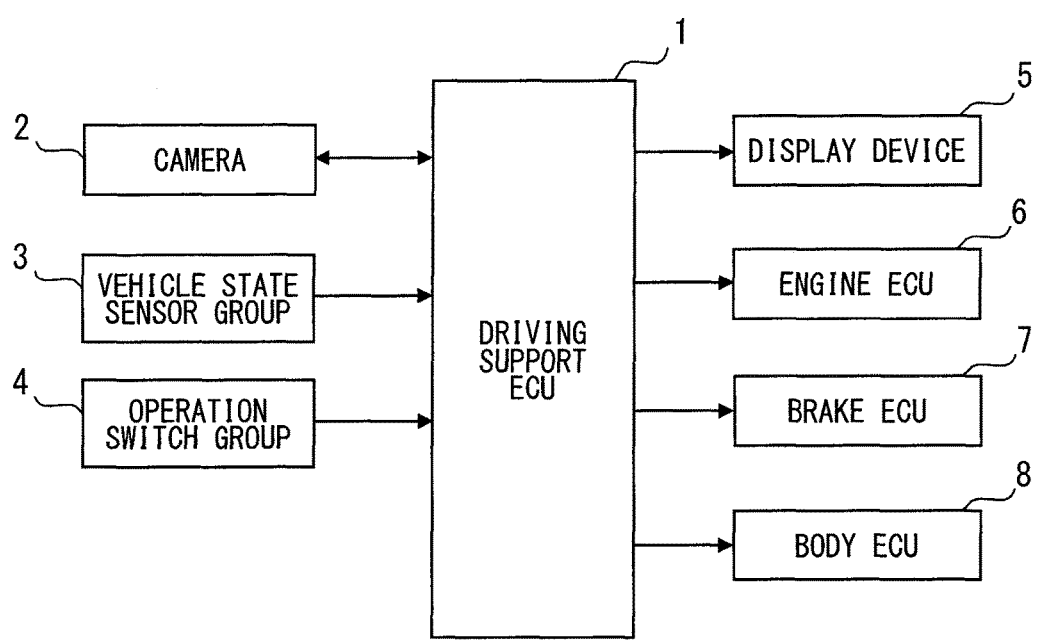
FIG. 1 is a block diagram that shows an example of a schematic configuration of a driving support system.

FIG. 1 illustrates an example of the schematic configuration of the driving support system 100 applied by the present disclosure. The driving support system 100 is mounted to a vehicle, and includes a driving support ECU 1, a camera 2, a vehicle state sensor group 3, an operation switch group 4, a display device 5, an engine ECU 6, a brake ECU 7, and a body ECU 8 as illustrated in FIG. 1. In the following, a vehicle mounted with the driving support system 100 is hereinafter referred to as "own vehicle".

The camera 2 is arranged at the own vehicle and photographs the periphery of the own vehicle. This camera 2 corresponds to an imaging device. In the present embodiment, for example, a front camera for photographing the front side of the own vehicle with a prescribed angle range, a back camera for photographing the back side of the own vehicle with a prescribed angle range, a left camera for photographing the left side of the own vehicle with a prescribed angle range, and a right camera for photographing the right side of the own vehicle with a prescribed angle range are used as the camera 2. The camera 2 sets the road surface around the own vehicle as the photographing range through the front camera, back camera, left camera and right camera.

The vehicle state sensor group 3 may be a various sensor group for detecting the vehicle state of the own vehicle. The vehicle state sensor group 3 includes, for example, a vehicle speed sensor for detecting the vehicle speed of the own vehicle, a shift position sensor for detecting the shift position of the own vehicle, an engine rotation number sensor for detecting the rotation number of an engine, and a steering sensor for detecting a steering angle. The operation switch 4 is, for example, a mechanical switch provided at the periphery of a steering wheel.

The display device 5 displays text or an image in correspondence with the instruction from the driving support ECU 1. For example, the display device 5 may display in full color, and may be configured by the use of a liquid crystal display or the like. The display device 5 may also be configured by using a display provided at an instrumental panel or the like, or may be configured by using an HUD (Head-Up Display).

The engine ECU 6 causes the own vehicle to accelerate by controlling, for example, valve timing, fuel injection amount and ignition timing of the engine in the own vehicle. The brake ECU 7 controls the own vehicle to decelerate by controlling a brake actuator for applying braking force to the own vehicle. The body ECU 8 controls, for example, the illumination of a head light or hazard lamp, locking or unlocking of a door, and a power window.

The driving support ECU 1 is mainly configured as a microcomputer, and is configured by a memory device such as a well-known CPU, ROM or RAM, I/O and a bus connecting to these devices. The driving support ECU 1 executes a variety of processes based on various kinds of information inputted from the camera 2, the vehicle state sensor group 3 and the operation switch group 4 or the like. The driving support ECU 1 corresponds to the driving support apparatus.

It is noted that a part or the whole part of the functions executed by the driving support ECU 1 is configured by hardware through one or a plurality of ICs or the like. In addition, the driving support ECU 1 is not only necessarily configured by one ECU, but may also be configured by a plurality of ECUs.

<The Detailed Configuration of the Driving Support ECU 1 in First Embodiment>

Figure 2:
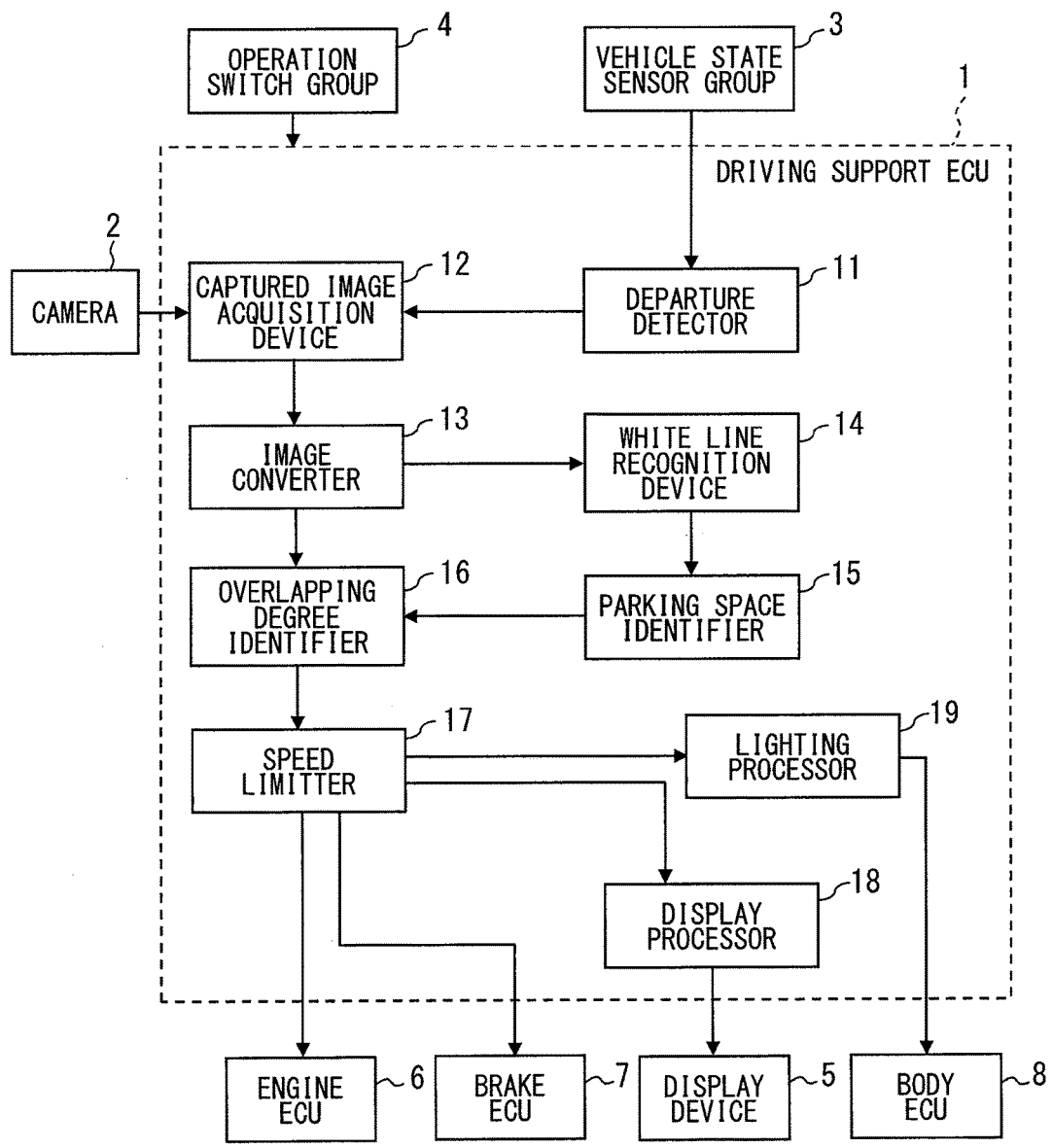
FIG. 2 is a block diagram that shows an example of a schematic configuration of a driving support ECU.

As shown in FIG. 2, the driving support ECU 1 includes a departure detector 11, a captured image acquisition device 12, an image converter 13, a white line recognition device 14, a parking space identifier 15, an overlapping degree identifier 16, a speed limiter 17, a display processor 18 and a lighting processor 19.

The departure detector 11 detects the departure from the own vehicle's parking. As an example, the departure from parking is detected based on the situation where the shift position moves to a forward position or a backward position from a parking position from a signal of the shift position sensor among the vehicle state sensor group 3. Other than that, the departure detector 11 may detect the departure from parking when the activation of the engine is detected based on a signal from the engine rotation number sensor among the vehicle state sensor group 3, or alternatively may detect the departure from parking based on the combination of the above-mentioned conditions.

The captured image acquisition device 12 successively acquires captured images taken by the camera 2. In the present embodiment, the captured images taken respectively by the front camera, the back camera, the left camera and the right camera are successively acquired.

The image converter 13 converts captured images respectively taken by the front camera, back camera, left camera and right camera which are acquired by the captured image acquisition device 12 to image data (in other words, a bird's eye view image looking down a ground surface in a vertical direction) with a geographical surface coordinate system as a road surface coordinate system where the viewpoint above the own vehicle is configured as a viewpoint position, by using a well-known coordinate conversion method.

The image converter 13 then causes bird's eye view images respectively taken by the front camera, the back camera, the left camera and the right camera to move around or in parallel to be arranged on one coordinate plane (in other words, arranging a bird's eye view image to be viewed as one image) by using a well-known conversion method, and generates a synthesized image for synthesizing these bird eye's view images. It is noted that the image converter 13 may convert a captured image to a bird's eye view image after executing necessary image processing such as correcting lens distortion in a captured image.

The image converter 13 reads out an image of the own vehicle preliminarily stored in the memory of the driving support ECU 1 and arranges at a location corresponding to the position of the own vehicle and synthesizes the image with the bird's eye view image in a situation where a synthesized image is generated.

The position of the own vehicle in the synthesized image may be identified by a part of the own vehicle contained in a captured image when a part of the own vehicle is in the captured image. It is noted that even when a part of the own vehicle is not contained in a captured image, the position of the own vehicle in the synthesized image can be identified. The detailed explanation is written in the following.

When the installation position and the direction of an optical axis of the camera 2 relative to the own vehicle are determined, the correspondence relation between the position in the captured image and the installation position of the camera 2. Accordingly, the position of the camera 2 relative to the position in the synthesized image can also be identified based on the installation position and the direction of the optical axis of the camera relative to the own vehicle. In addition, since the position of the own vehicle relative to the installation position of the camera 2 can be identified based on the installation position of the camera 2 relative to the own vehicle, the position of the own vehicle in the synthesized image can also be identified based on the position of the camera 2 relative to the position in the synthesized image.

The white line recognition device 14 recognizes a white line with the use of a technique such as well-known edge detection from the synthesized image acquired at the image converter 13. The present embodiment describes that the parking space as a parking target is surrounded by two parallel white lines; and describes the situation that two parallel white lines are recognized by the white line recognition device 14 as an example in the following.

Figure 3:
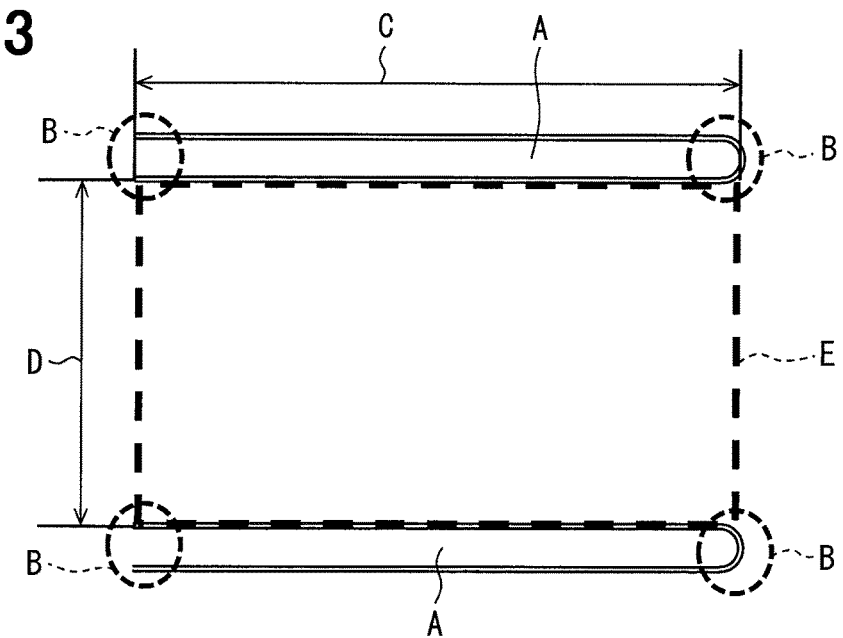
FIG. 3 is a diagram that illustrates an example of identifying a parking space.
Figure 4:
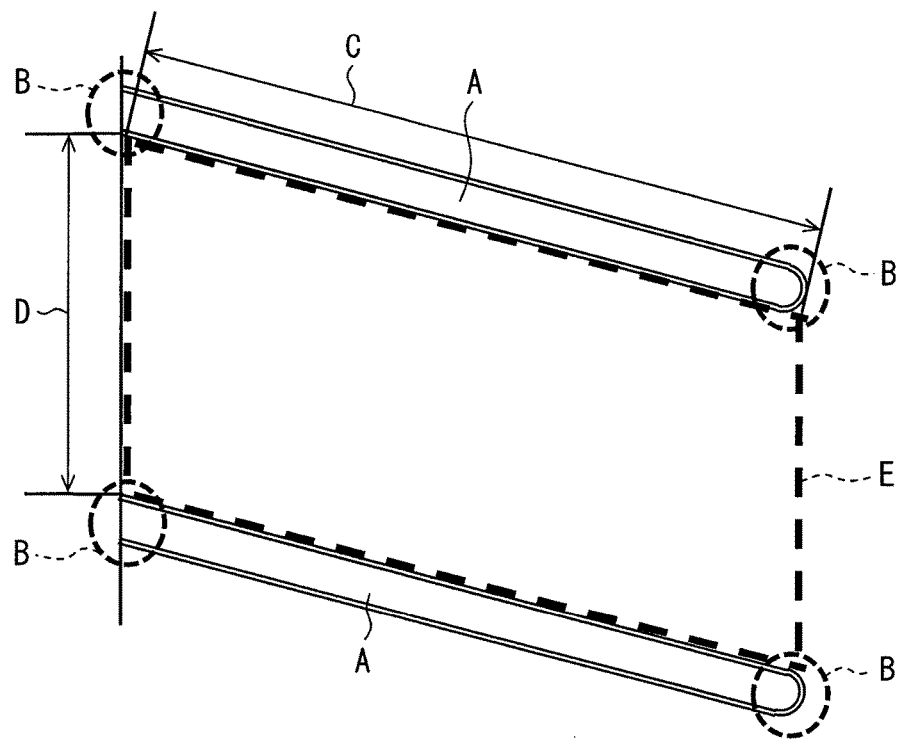
FIG. 4 is a diagram that illustrates an example of identifying a parking space.

The parking space identifier 15 identifies a parking space based on the white line recognized by the white line recognition device 14. FIGS. 3 and 4 are used for explaining a particular example. FIG. 3 illustrates an example of a parking space with the parking space line is drawn in a straight line; and FIG. 4 illustrates an example of a parking space with the parking space line is drawn diagonally.

The parking space identifier 15 detects ends parts of the respective white lines (see B in FIGS. 3 and 4) from the two white lines (see A in FIGS. 3 and 4) recognized by the white line recognition device 14, and identifies a rectangle where the detected four end parts are vertexes. It is noted that when there is a remarkable difference in the lengths of the mutually opposite sides of the rectangle where four end parts are vertexes, the parking space may be identified so as to match the length of the longer side as the white line is missing. Accordingly, when one part of the actual four vertexes of the parking space cannot be recognized by the white line recognition device 14, the parking space can be identified with higher accuracy.

Next, when the length of a set of sides of the identified rectangle in a longer direction (see C in FIGS. 3 and 4) or the length of a set of sides of the identified rectangle in a shorter direction (see D in FIGS. 3 and 4) fits to the length as the side of the parking space, the identified rectangle is identified as the parking space (see E in FIGS. 3 and 4). On the other hands, when the length of the side of the identified rectangle is deviated from the length of the side of the parking space (for example, the side in the shorter direction is equal to or larger than 2.75 m), the identified rectangle is not identified as the parking space as not subject to be controlled.

It is noted that even when the parking space surrounded by two parallel white lines and one or two white lines for connecting the two parallel lines is regarded as a target, the parking space identifier 15 may also identify the parking space as described above similarly by using the angle formed between the white lines or the end parts the white lines as the above-mentioned four vertexes.

The overlapping degree identifier 16 identifies the overlapping degree between the parking space and the own vehicle based on the synthesized image acquired at the image converter 13 and the parking space identified at the parking space identifier 15. As a particular example, the proportion of the region of the parking space, which is identified by the parking space identifier 15, in the synthesized image acquired by the image converter 13 to the region where the own vehicle in the synthesized image is overlapped is identified as the overlapping degree.

Figure 5:
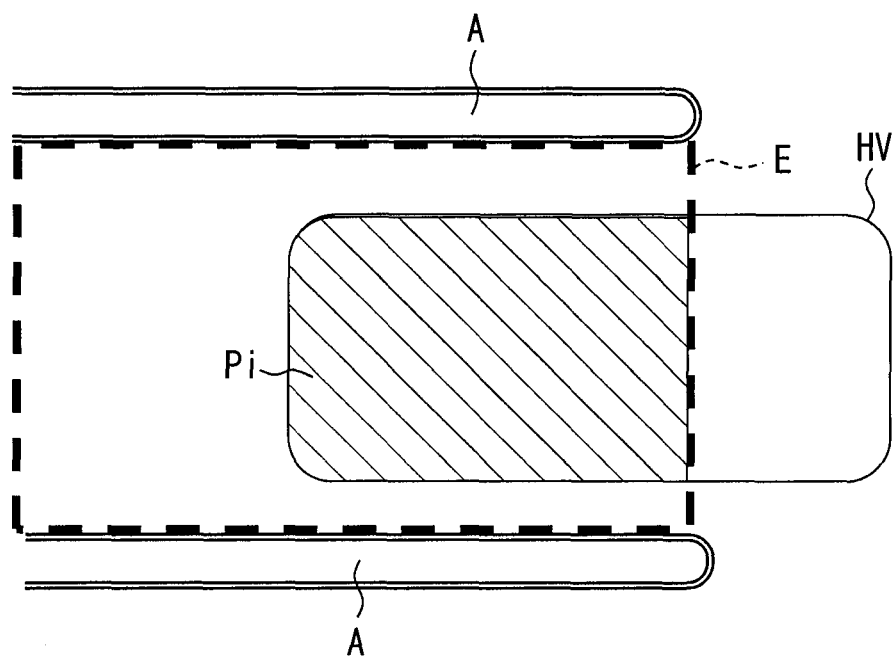
FIG. 5 is a diagram that illustrates an example of identifying overlapping degree between a vehicle and a parking space.

In other words, as shown in FIG. 5, the proportion (%) of the area of the parking space (see E in FIG. 5) to the area of the region (see Pi in FIG. 5) where the own vehicle (see HV in FIG. 5) and the parking space are overlapped is identified as the overlapping degree. As an example in the present embodiment, the proportion of the total pixel number of the region where the own vehicle and the parking space are overlapped in the synthesized image to the total pixel number of the parking space in the synthesized image is identified as the overlapping degree.

It is noted that the overlapping degree of the parking space and the own vehicle may be the proportion of the area of the region (see Pi in FIG. 5) where the own vehicle and the parking space are overlapped to the area of the own vehicle. In addition, the following describes the speed limiter 17, the display processor 18 and the lighting processor 19 in detail.

<Departure from Parking Space Supporting Process in First Embodiment>

Figure 6:
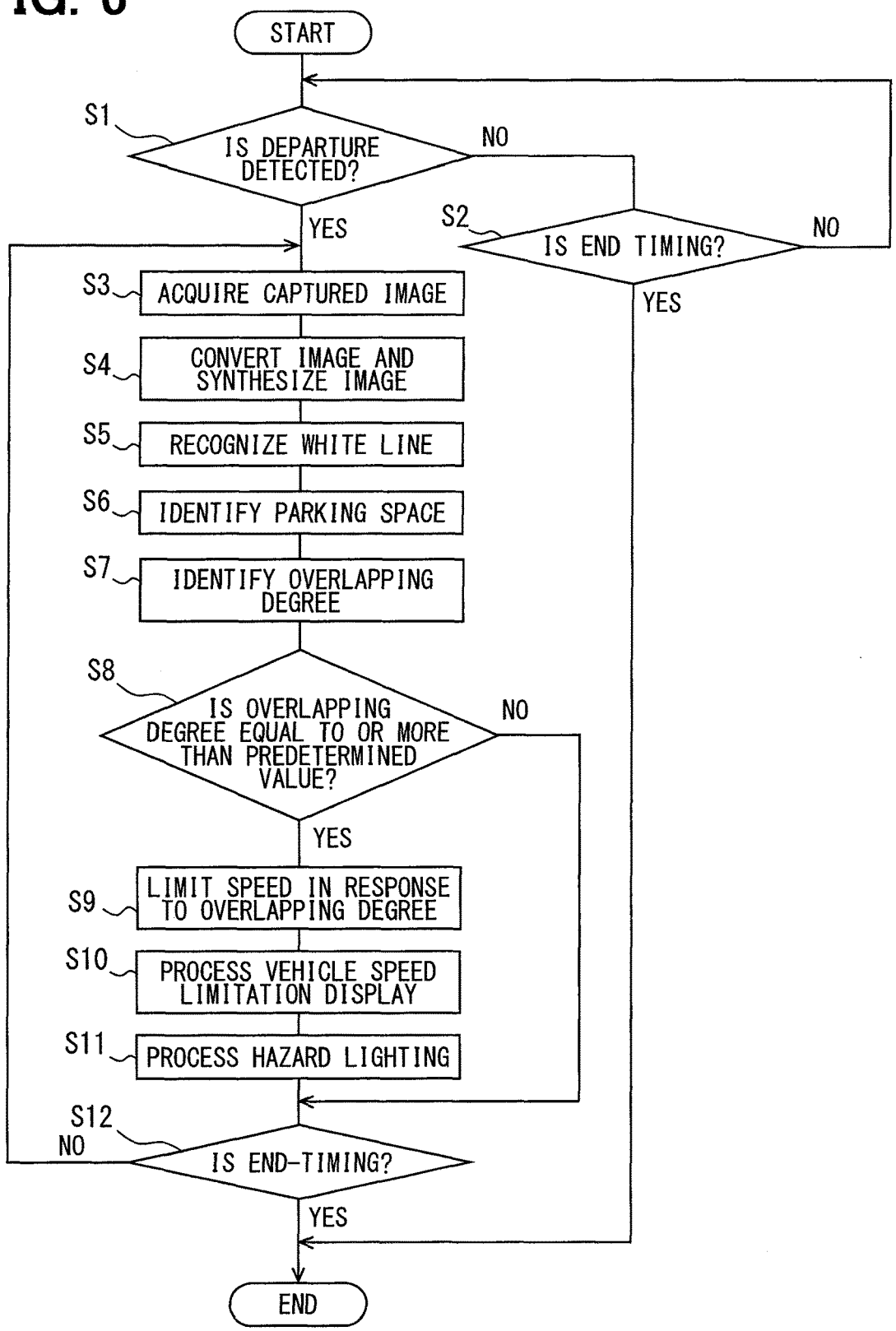
FIG. 6 is a flowchart that shows an example of a flow in a departure from parking space supporting process executed by a driving support ECU in accordance with a first embodiment.

The departure from parking space supporting process executed by the driving support ECU 1 is described herein with the flowchart in FIG. 3. The departure from parking space supporting process inhibits sudden acceleration while getting the own vehicle parking in the parking space to depart. The flowchart in FIG. 6 is initiated when the ignition power source in the own vehicle is turned on.

In step S1, when the departure detector 11 detects the own vehicle departs from parking (YES in S1), the process is shifted to step S3. On the other hands, when the vehicle departing from parking is not detected (NO in S1), the process is shifted to step S2. The departure may refer to a forward movement or a backward movement.

In step S2, when the departure from parking space supporting process is at an end timing (YES in S2), the departure from parking space supporting process is terminated. In addition, when the departure from parking space supporting process is not at the end timing (NO in S2), the process returns to S1 and is repeated. As an example, the ending timing of the departure from parking space supporting process may be at the situation where the ignition power source of the own vehicle is turned off.

In step S3, the captured image acquisition device 12 acquires captured images respectively by the front camera, the back camera, the left camera, the right camera.

In step S4, the image converter 13 converts the captured images taken by the front camera, the back camera, the left camera and the right camera acquired at S3 to bird's eye view images, and generates a synthesized image, which synthesizes these bird's eye view images. In step S5, the white line recognition device 14 recognizes white lines from the synthesized image acquired at S4. In step S6, the parking space identifier 15 identifies the parking space based on the white lines recognized at S5.

In step S7, the overlapping degree identifier 16 identifies the overlapping degree between the parking space and the own vehicle based on the synthesized image acquired at S4 and the parking space identified at S5. In step S8, when the overlapping degree identified at S7 is equal to or larger than a predetermined value (YES in S8), the process is shifted to step S9. On the other hands, the overlapping degree identified at S7 is less than the predetermined value (NO in S8), the process is shifted to step S12. The predetermined value mentioned herein may be set at any value. For example, the predetermined value may be set at 20%.

In step S9, the speed limiter 17 limits the maximum value of the own vehicle's speed to be lower gradually in response to the overlapping degree identified at the overlapping degree identifier 16 getting larger. For example, when the overlapping degree is equal to or more than 50%, the maximum value of the vehicle speed may be set at 2 km/h; when the overlapping degree is equal to or more than 30% and is less than 50%, the maximum value of the vehicle speed may be set at 3 km/h; when the overlapping degree is larger than 0 and is less than 30%, the maximum value of the vehicle speed may be set at 5 km/h; and there is no limitation in the maximum value of the vehicle speed when the overlapping degree is 0%.

When the maximum value of the own vehicle's speed is limited, the speed limiter 17 provides an instruction to the engine ECU 6 and limits acceleration to hold the vehicle speed up to the limited maximum value. In addition, when it is needed to perform braking so as to hold the vehicle speed up to the limited maximum value, the speed limiter 17 provides an instruction to the brake ECU 7 so as to apply braking force to hold the vehicle speed up to the limited maximum value.

In step S10, the display processor 18 causes the display, which is indicative of currently limiting the own vehicle's speed, to be on the display device 5. In other words, when the speed limiter 17 limits the own vehicle's speed, the display indicative of currently limiting the own vehicle's speed is displayed on the display device 5. As an example, a text or icon indicative of currently limiting the own vehicle's speed may be displayed on the display device 5. Accordingly, a driver in the own vehicle can recognize that the own vehicle's speed is currently being limited. The display processor 18 corresponds to a display controller.

In step S11, a lighting processor 19 provides an instruction to the body ECU 8, and turns on a hazard lamp. In other words, the hazard lamp is turned on when the speed limiter 17 limits the own vehicle's speed. Accordingly, even when the own vehicle's speed is currently being limited and the own vehicle moves slowly, the drivers or pedestrians around the own vehicle can recognize that the own vehicle is in operation.

In step S12, when the departure from parking space supporting process is at the end timing (YES in S12), the departure from parking space supporting process is terminated. When the departure from parking space supporting process is not at the end timing (NO in S12), the process is shifted back to S3 and repetitively performed. As an example of the end timing of the departure from parking space supporting process described herein, it may be the situation where the distance between the current position of the own vehicle and the position of the target parking region stored in a parking region storage 63 is equal to or larger than, for example, the predetermined distance; or the situation where the ignition power source of the own vehicle is turned off.

It is noted that the operation switch group 4 may perform switching whether to execute the departure from parking space supporting process or not. In addition, the operation switch group may also perform switching whether to show the display indicative of currently limiting the own vehicle's speed or not; or whether to turn on the hazard lamp or not when the own vehicle's speed is currently being limited.

<The Summary of First Embodiment>

According to the configuration of the first embodiment, when the vehicle departs from parking, since the vehicle speed is limited to be less than or equal to the predetermined maximum value in a case where the overlapping degree to the own vehicle's parking space is equal to or larger than the predetermined value, it is possible to inhibit sudden acceleration when the own vehicle departs from the parking space.

In addition, since the maximum value of the own vehicle's speed is limited to be lower gradually as the overlapping degree towards the own vehicle's parking space gets larger, the own vehicle's speed is limited at a time of departing from the parking space while the own vehicle's speed gradually increases as the vehicle moves out from the parking space. Accordingly, the own vehicle can depart from the parking space while gradually increasing the vehicle speed, and the vehicle can depart from the parking space smoothly while inhibiting sudden acceleration at the time of departure.

Moreover, according to the configuration of the first embodiment, since it is not needed to add components for the existing acceleration device, it is also possible to inhibit sudden acceleration at the time of departing from the parking space while reducing the complexity of the mechanical structure in the acceleration device. As a result, it is possible to inhibit sudden acceleration at the time of departing from the parking space while reducing the complexity of the mechanical structure in the acceleration device.

A technique for inhibiting sudden acceleration to an obstacle direction by detecting an obstacle in front of the vehicle within the predetermined distance has been conventionally known. However, with regard to this technique, the own vehicle's sudden acceleration at the time of departing from the parking space is possible when there is no any obstacle. Even when there is no any obstacle around the own vehicle, the driver may be panic and have a further driving operational error caused by panic in a case where the own vehicle's sudden acceleration caused by an error in stepping between the brake pedal and the acceleration pedal. In contrast, according to the configuration of the first embodiment, there is a merit in that it is possible to inhibit sudden acceleration at the time of the own vehicle departing from the parking space even when there is no any obstacle around the own vehicle.

First Modification Example

In the flowchart of FIG. 6 in the first embodiment, when the departure from parking space supporting process in S12 is not at the end timing, the process is shifted back to S3 and is repeated. However, it is not restricted to this situation. For example, when the departure from parking space supporting process at S12 is not at the end timing, the process may be shifted back to S7 and be repeated (hereinafter referred to as "first modification example"). For simplicity in explaining the first modification example and other modification examples, the same reference numerals are appended to the components, which exhibit the same function as the one illustrated in the drawings used in describing the embodiments up to now, and the description of the same components is omitted.

In a situation of configuring the first modification example, with regard to the process performed at S7 after shifted back from S12, the overlapping degree identifier 16 estimates a change in the own vehicle's position from the process performed in S7 at a previous occasion, the overlapping degree between the parking space and the own vehicle based on the estimated own vehicle's position, the synthesized image acquired at S4, and the parking space identified at S5. A change in the own vehicle's position may be estimated from time series data of vehicle speed and steering angle from the process performed in S7 at the previous occasion to the process performed in S7 at the current occasion. It is noted that the vehicle speed and steering angle may be successively acquired from the vehicle state sensor group 3.

According to configuration in the first modification example, it is not necessary to successively acquire captured images from the camera 2 and to successively perform image conversion from the acquired captured images, image synthesis, white line recognition and parking space identification. Accordingly, the processing load caused by successively performing image conversion, image synthesis, white line recognition and parking space identification can be reduced.

Second Modification Example

The first embodiment illustrates an example in which sudden acceleration is inhibited when the own vehicle parking at the parking space is departed. However, it is not restricted to this example. For example, sudden acceleration may also be inhibited when the own vehicle is parking at the parking space (hereinafter referred to as second modification example). The following describes the second modification example.

The driving support system 100 in the second modification example is identical to the driving support system 100 in the first embodiment except that the driving support system 100 in the second modification example includes a parking start detector 20 and a history storage 21 in the driving support ECU 1; and the driving support ECU 1 executes a parking into parking space supporting process for inhibiting sudden acceleration when the own vehicle is parking into the parking space.

<The Detailed Configuration of Driving Support ECU 1 in Second Modification Example>

Figure 7:
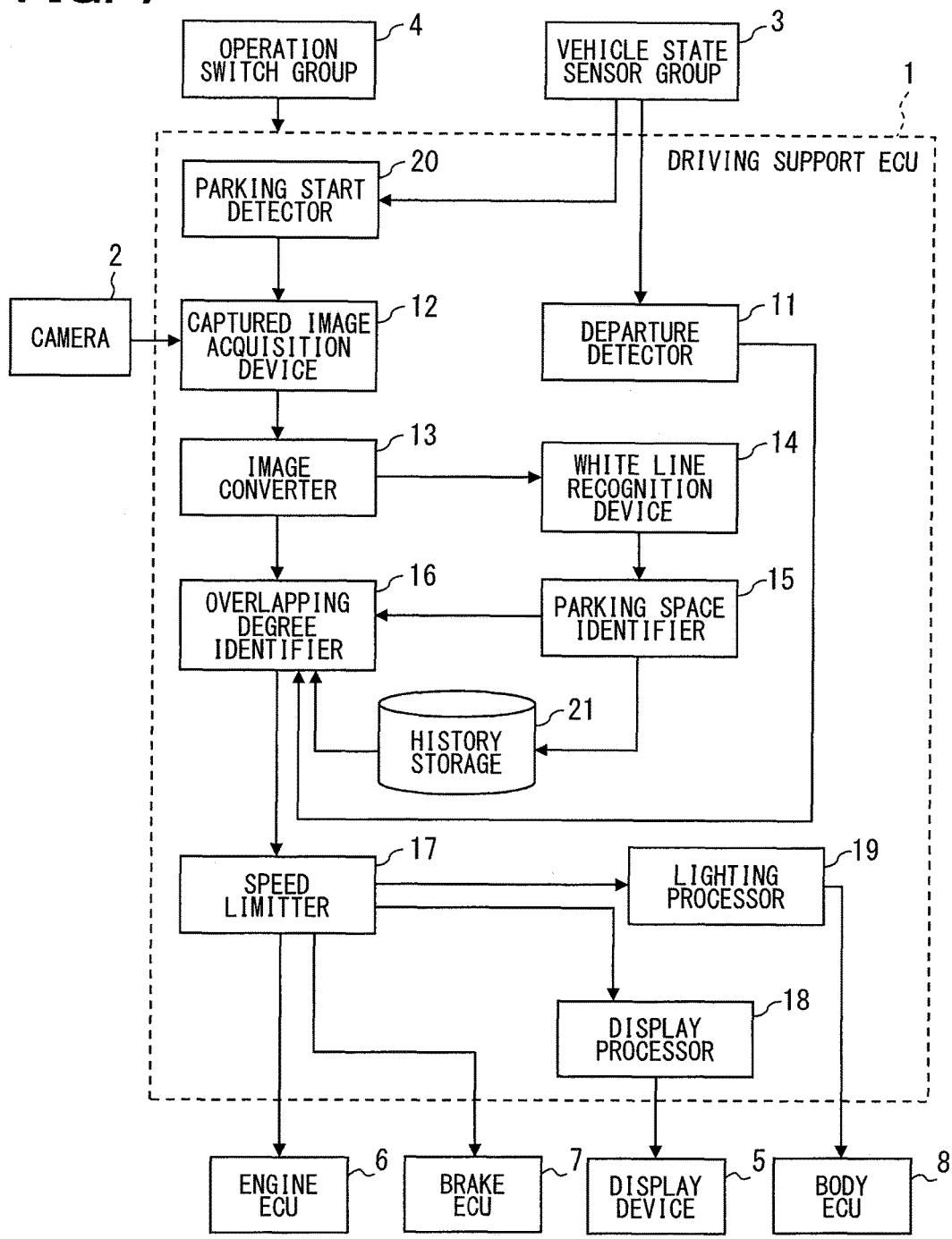
FIG. 7 is a block diagram that shows an example of a schematic configuration of a driving support ECU in accordance with a second modification example.

This section describes the driving support ECU 1 in the second modification example with the use of FIG. 7. The driving support ECU 1 in the second modification example includes the departure detector 11, the captured image acquisition device 12, the image converter 13, the white line recognition device 14, the parking space identifier 15, the overlapping degree identifier 16, the speed limiter 17, the display processor 18, the lighting processor 19, the parking start detector 20, and the history storage 21.

The parking start detector 20 detects that the vehicle starts parking. As an example, the parking start with the own vehicle in a backward movement is detected when the vehicle speed is less than or equal to slow speed level and the shift position moves to a backward position. The vehicle speed may be detected based on a signal of the vehicle speed sensor in the vehicle state sensor group 3, and the shift position may be detected based on a signal from the shift position sensor in the vehicle state sensor group 3. In addition, it may be detected that the own vehicle starts parking based on having a switch operation, which is requested by the driver, to start the parking into parking space supporting process. It is noted that the history storage 21 is hereinafter described in detail.

<Parking into Parking Space Supporting Process>

Figure 8:
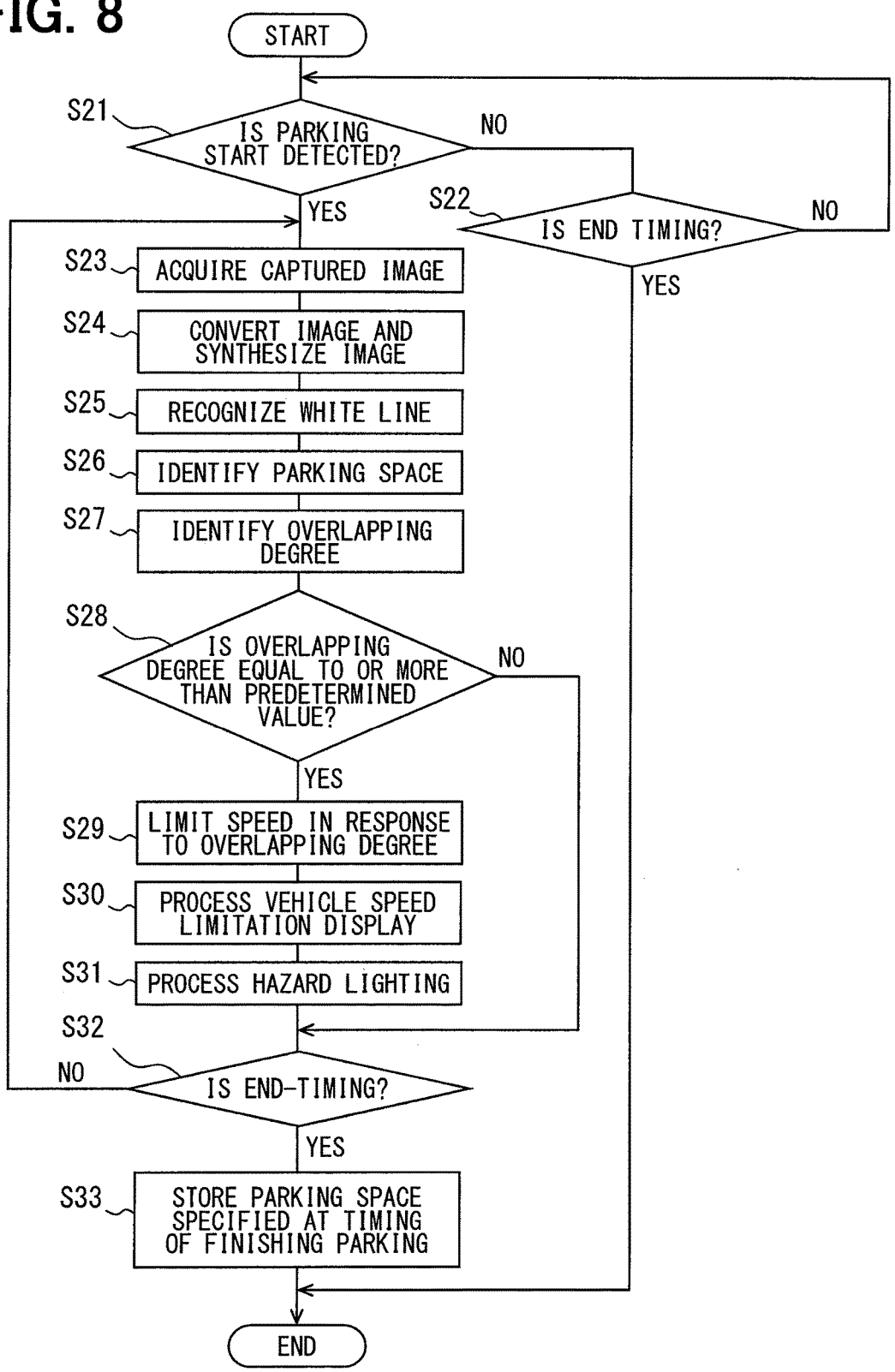
FIG. 8 is a flowchart that shows an example of a flow of an entering parking space supporting process executed by the driving support ECU in accordance with the second modification example.

Next, the parking into parking space supporting process executed by the driving support ECU 1 is described with the use of a flowchart in FIG. 8. The flowchart illustrated in FIG. 8, as an example, may be configured to start when the own vehicle's speed exceeds a slow speed level.

First, when the parking start detector 20 detects that the vehicle starts parking in step S21 (YES in S21), the process is shifted to step S23. On the other hands, when the parking start detector 20 does not detect that the vehicle starts parking (NO in S21), the process is shifted to step S22. Parking may be performed by a forward movement or a backward movement.

In step S22, when the parking into parking space supporting process is at the end timing (YES in S22), the parking into parking space supporting process is terminated. When the parking into parking space supporting process is not at the end timing (NO in step S22), the process is shifted back to S21 and repeated. As an example of the end timing of the parking into parking space supporting process described herein, it may be in a situation in that the own vehicle's speed exceeds a slow speed level.

In step S23, the captured image acquisition device 12 acquires captured images taken respectively by the front camera, the back camera, the left camera and the right camera. In step S24, the image converter 13 converts the captured images, which are taken respectively by the front camera, the back camera, the left camera and the right camera, acquired at S23 and converts these captured images to bird's eye view images, and generates a synthesized image, which synthesizes these bird's eye view images. In step S25, the white line recognition device 14 recognizes white lines based on the synthesized image acquired at S24. In step S26, the parking space identifier 15 specifies a parking space based on the white lines recognized at S25.

In step S27, the overlapping degree identifier 16 identifies the overlapping degree between the parking space and the own vehicle based on the synthesized image acquired at S24 and the parking space identified at S25. In step S28, when the overlapping degree identified at S27 as similar to S8 is more than or equal to a predetermined value (YES in S28), the process is shifted to step S29. On the other hands, when the overlapping degree identified at S28 is less than the predetermined value (NO in S28), the process is shifted to step S12.

In step S29, as similar to S9, the speed limiter 17 limits the maximum value of the own vehicle's speed to be lower gradually as the overlapping degree identified by the overlapping degree identifier 16 gets larger. In step S30, as similar to S10, the display processor 18 controls the display device 5 to show a display indicative of the own vehicle's speed currently being limited. In step S31, as similar to S11, the lighting processor 19 provides an instruction to the body ECU 8 and turns on the hazard lamp.

In step S32, when the parking into parking space supporting process is at the end timing (YES in S32), the process is shifted to step S33. When the parking into parking space supporting process is not at the end timing (NO in S32), the process is shifted back to S23 and repeated. As an example of the end timing of the parking into parking space supporting process described herein may be at the situation where the own vehicle's shift position is at the parking position; or at the situation where the own vehicle's ignition power source is turned off.

In step S33, the parking space identifier 15 stores the parking space, which is identified by the process at S26 at the latest occasion, in the history storage 21. In other words, the parking space, which is identified at the time point where the own vehicle finishes parking at the parking space, is stored in the history storage 21. The history storage 21 corresponds to a storage device. When the parking space is stored in the history storage 21, it may be configured to store the parking space's position relative to the own vehicle's position. After finishing the process at S33, the parking into parking space supporting process is terminated.

<Departure from Parking Space Supporting Process in Second Modification Example>

Figure 9:
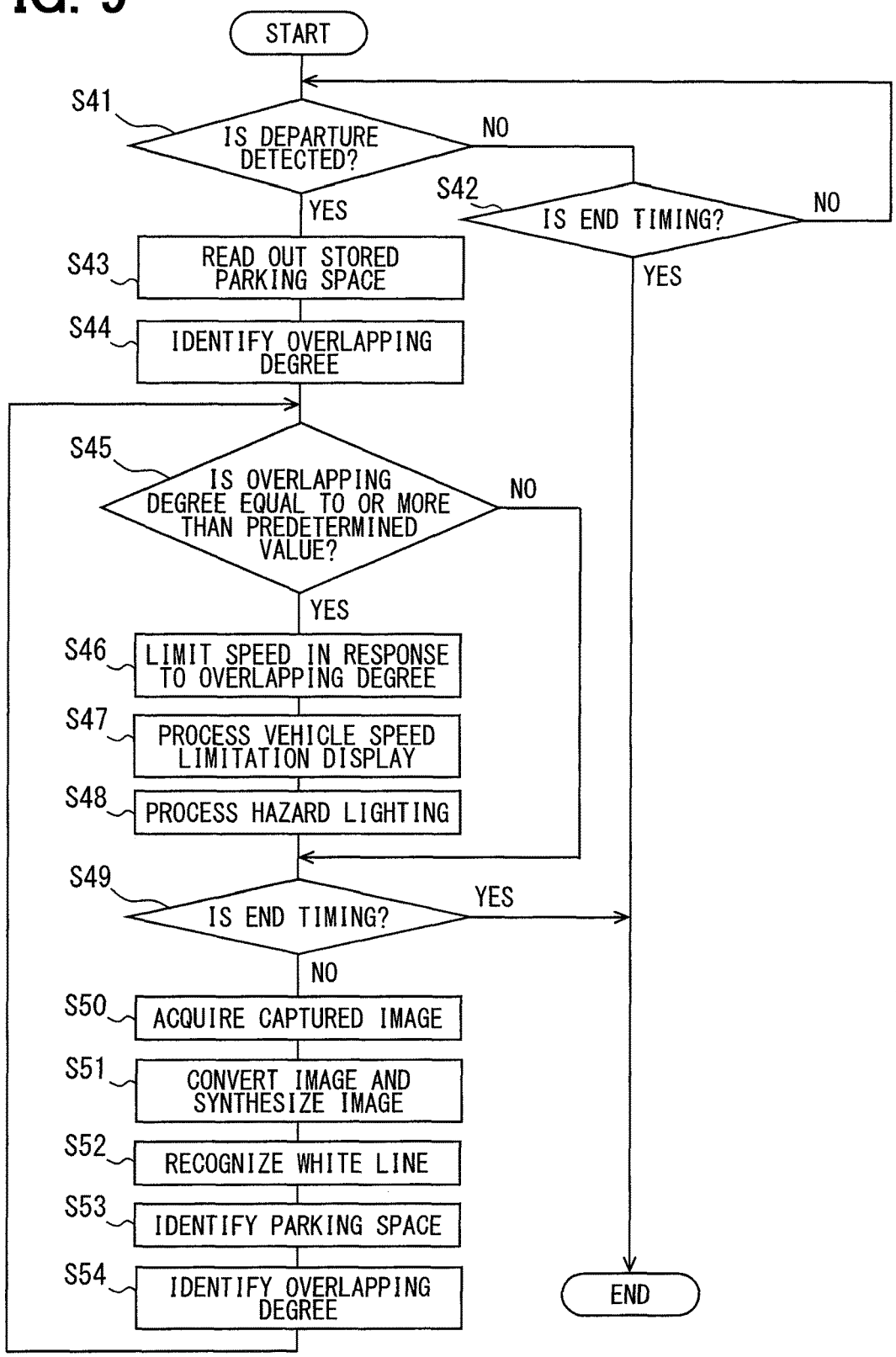
FIG. 9 is a flowchart that shows an example of a flow of a departure from parking space supporting process executed by the driving support ECU in accordance with the second modification example.

Next, the departure from parking space supporting process executed by the driving support ECU 1 according to the second modification example is described with the use of a flowchart in FIG. 9. The flowchart in FIG. 9, as an example, is started after the own vehicle's ignition power source is turned on.

First, in step S41, as similar to S1, when the departure detector 11 detects that the own vehicle departs from parking (YES in S41), the process is shifted to step S43. On the other hands, when the departure detector 43 does not detect that the own vehicle departs from parking (NO in S41), the process is shifted to step S42.

In step S42, as similar to S2, the departure from parking space supporting process is at the end timing (YES at S42), the departure from parking space supporting process is terminated. In addition, when the departure from parking space is not at the end timing (NO in S42), the process is shifted back to S41 and repeated.

In step S43, the overlapping degree identifier 16 reads out the parking space, which is identified at a time point where the own vehicle finishing parking at the parking space, stored in the history storage 21 in the parking into parking space supporting process. In step S44, as similar to S7, the overlapping identifier 16 identifies the overlapping degree between the parking space and the own vehicle based on the parking space, which is identified at the time point where the own vehicle finishes parking at the parking space, read out from the storage 21 at S43.

In step S45, as similar to S8, when the overlapping degree identified by the overlapping identifier 16 is more than or equal to the predetermined value (YES in S45), the process is shifted to step S46. On the other hands, when the overlapping degree is less than the predetermined value (NO in S45), the process is shifted to step S49.

The process from step S46 to step S48 is identical to the process from S9 to S11. In step S49, as similar to S12, when the departure from parking space supporting process is at the end timing (YES in S49), the departure from parking space supporting process is terminated. In addition, when the departure from parking space supporting process is not at the end timing (NO in S49), the process is shifted to step S50.

The process from step S50 to step S54 is similar to the process from S3 to S7. After the process is performed at S54, the process is shifted back to S45 and repeated.

It is noted that the operation switch group 4 can perform switching so as to whether to execute the parking into parking space supporting process and the departure from parking space supporting process. For example, the operation switch group 4 may perform switching so as to execute only one of the parking into parking space supporting process and the departure from parking space supporting process.

<The Summary of Second Modification Example>

According to the configuration of the second modification example, when the overlapping degree towards the own vehicle's parking space is more than or equal to the predetermined value at the time of parking, since the vehicle speed is limited to be equal to or less than the maximum value, it is possible to inhibit sudden acceleration at the time of parking.

In addition, since the maximum value of the own vehicle's speed is limited to be lower gradually as the overlapping degree towards the own vehicle's parking space gets larger, it is configured to make the own vehicle's speed getting lower as the own vehicle enters the parking space while limiting the own vehicle's speed at the time of parking. Accordingly, it can be configured such that the own vehicle is entering the parking space while lowering the vehicle speed gradually; or it can be configured to perform parking smoothly while sudden acceleration is inhibited at the time of parking.

Other than that, according to the configuration of the second modification example, when it is detected that the own vehicle departs from parking, the overlapping degree identifier 16 reads out the parking space, which is identified at the time where the own vehicle finishes parking at the parking space, from the history storage 21 and identifies the overlapping degree between the parking space and the own vehicle based on the parking space, which is read out by the overlapping degree identifier 16. Accordingly, when it is detected that when the own vehicle departs from parking, it is possible to acquire new captured images taken by the camera 2 and perform image conversion, white line recognition, and parking space identification so as to save time for identifying the overlapping degree between the parking space and the own vehicle and reducing processing load.

Moreover, with regard to the configuration of the second modification example, since it is not necessary to add components for the existing acceleration device, it is possible to inhibit sudden acceleration at the time of departing from the parking space while reducing the complexity of the mechanical structure in the acceleration device. As a result, it is possible to inhibit sudden acceleration at the time of parking while reducing the complexity of the mechanical structure in the acceleration device.

Third Modification Example

In the flowchart of FIG. 8 according to the second modification example, for example, when the parking into parking space supporting process at S32 is not at the end timing, the process may be shifted back to S27 and repeated. In this situation, as similar to the first modification example, the overlapping degree identifier 16 may estimate a change of the own vehicle's position based on the process of S27 at the previous occasion, and may identify the overlapping degree between the parking space and the own vehicle based on the estimated own vehicle's position, the synthesized image acquired at S24, and the parking space identified at S25.

Fourth Modification Example

With regard to the second modification example, in the departure from parking space supporting process, when it is detected that the own vehicle departs from parking, the overlapping degree between the parking space and the own vehicle is identified based on the parking space, which is identified at the time when the own vehicle finishes parking at the parking space. However, it is only restricted to this case. For example, as similar to the departure from parking space process according to the first embodiment, when it is detected that the own vehicle departs from parking, it may be configured such that the captured images taken by the camera 2 is acquired; the image conversion, image synthesis, white line recognition, and parking space identification are performed to identify the overlapping degree between the parking space and the own vehicle.

Fifth Modification Example

The second modification example illustrates that both of the departure from parking space supporting process and the parking into parking space supporting process are performed. However, it is not only restricted to this case. For example, the parking into parking space supporting process as one of the departure from parking space supporting process and the parking into parking space supporting process may only be performed. When only the parking into parking space supporting process is performed, the process at S33 in the flowchart of FIG. 8 may be omitted.

Sixth Modification Example

The above-mentioned embodiment illustrates that, when the overlapping degree, which is identified by the overlapping degree identifier 16, is equal to or larger than the predetermined value, the maximum value of the own vehicle's speed is set to be lower gradually as the overlapping degree gets larger. However, it is not only restricted to this case. For example, when the overlapping degree identified by the overlapping identifier 16 is equal to or larger than the predetermined value, the maximum value of the own vehicle's speed may be limited at a fixed value, which is predetermined.

Seventh Modification Example

The above-mentioned embodiment illustrates that the proportion of the area where the own vehicle and the parking space are overlapped each other is identified as the overlapping degree. However, it is not only restricted to this case. For example, the proportion of the overlapping length between the own vehicle and the parking space in a front-back direction may also be identified as the overlapping degree (hereinafter referred as the seventh modification example).

Figure 10:
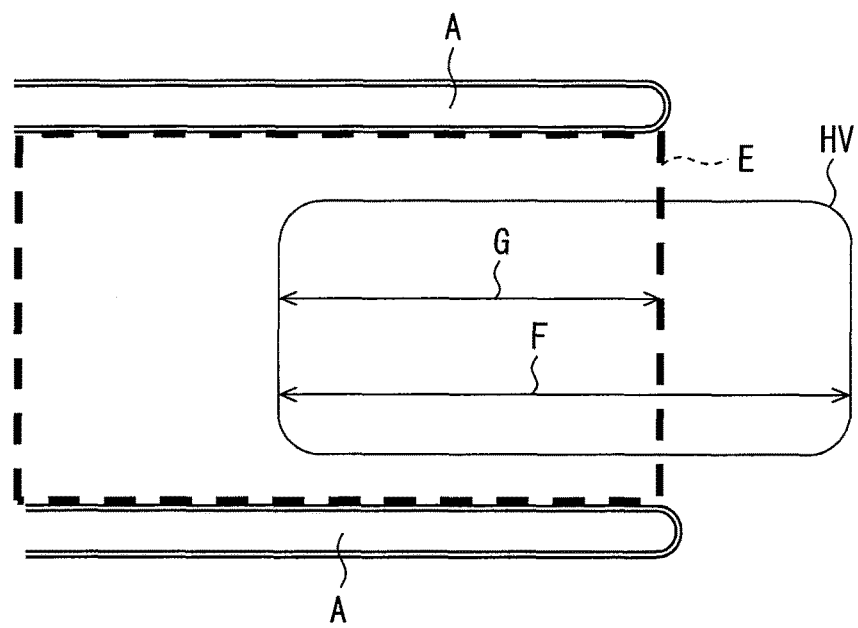
FIG. 10 is a diagram that illustrates an example of identifying the overlapping degree between a vehicle and a parking space.

The seventh modification example is described herein with the use of FIG. 10. In FIG. 10, A represents the white line; E represents the parking space identified by the parking space identifier 15; HV represents the own vehicle; F represents the length of the own vehicle in the front-back direction (in other words, the vehicle length); and G represents the overlapping length between the own vehicle and the parking space in the own vehicle's front-back direction. In the seventh modification example, the proportion of the overlapping length G in the own vehicle's front-back direction between the own vehicle HV and the parking space E to the vehicle length F of the own vehicle HV is identified as the overlapping degree.

It is noted that the proportion of the overlapping length between the own vehicle and the parking space in the own vehicle's front-back direction may be the proportion of the overlapping length (see G in FIG. 10) of the own vehicle and the parking space in the own vehicle's front-back direction relative to the length of the parking space in a longer direction.

Eighth Modification Example

In addition, it is not restricted to the case where the area of the region where the own vehicle and the parking space are overlapped to each other; or the case where the proportion of the overlapped length between the own vehicle and the parking space in the own vehicle's front-back direction, is identified as the overlapping degree. The area of the region where the own vehicle and the parking space, or the overlapping length of the own vehicle in a front-back direction between the own vehicle and the parking space may also be identified as the overlapping degree.

Ninth Modification Example

The above-mentioned embodiment illustrates the use of four cameras, which are the front camera, the back camera, the left camera and the right camera, as the camera 2. However, it is not only restricted to this case. For example, three cameras or two cameras or only one camera may be used as the camera 2.

For example, when three cameras are used as the camera 2, a camera used for taking the front part to the right side of the own vehicle with a predetermined angle range, a camera used for taking the front part to the left part of the own vehicle with a predetermined angle range, and the above-mentioned back camera may be configured to film the road surface surrounding the own vehicle as the photographing range.

In addition, when two cameras are used as the camera 2, it could be configured such that the above-mentioned front and back cameras are used as a pair; or the above-mentioned left and right cameras are used as a pair. In this situation, with regard to a pair of the front camera and the back camera, the predetermined angle range of the left and right sides of the own vehicle is removed out from the photographing range; and with regard to a pair of the left camera and the right camera, the predetermined angle range at the front and back of the own vehicle is removed. However, with regard to a white line of the parking space included in a range removed from the photographing range, as described in above, since the correspondence relation between the position in the captured image and the installation position of the camera 2 can be identified based on the installation position and the direction of the optical axis of the camera 2 relative to the own vehicle, the white line can be estimated by using the vehicle length or width. Accordingly, even when two cameras are used as the camera 2, the parking space can be identified.

In addition, when only one camera is used as the camera 2, a synthesized image, which is synthesized by arranging bird's eye view images of a plurality of captured images aligned in a time series taken by one camera so as to be seen as one image, is acquired to perform white line recognition or the parking space identification based on the synthesized image. Accordingly, based on the captured image acquired though one degree of imaging by one camera, even when only one or two vertexes of the four vertexes of the white lines of the parking space can be identified, with the use of the synthesized image synthesizing the bird's eye view images of the plurality of the captured images aligned in a time series, it is possible to detect three or more vertexes among the four vertexes so as to identify the parking space.

Tenth Modification Example

The above-mentioned embodiment illustrates that the overlapping degree between the own vehicle and the parking space is identified by using the bird's eye view image, which is converted from the captured images. However, it is not only restricted to this case. For example, the overlapping degree between the own vehicle and the parking space may also be identified without using the bird's eye view image, which is converted from the captured images.

Eleventh Modification Example

The above-mentioned embodiment illustrates an example in which a driving support system 100 is mounted to an engine vehicle. However, it is not only restricted to this case. For example, the driving support system 100 may be configured to be mounted to an electric automobile or a hybrid vehicle. When the driving support system 100 is mounted to the electric automobile or a hybrid vehicle, the rotation number of a travelling motor may be used instead of the rotation number of an engine.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

The invention claimed is:

1. A driving support apparatus mounted to a vehicle, the driving support apparatus comprising:
    a parking space identifier that identifies a parking space by using an imaging process based on a captured image taken by an imaging device, which is mounted to the vehicle and takes an image of the surrounding of the vehicle;
    an overlapping degree identifier that identifies an overlapping degree of the vehicle towards the parking space based on the captured image and the parking space identified by the parking space identifier; and
    a speed limiter that limits a vehicle speed to be less than or equal to a maximum value, which is predetermined, when the overlapping degree identified by the overlapping degree identifier is larger to or equal to a predetermined value.

2. The driving support apparatus according to claim 1, wherein the speed limiter lowers the maximum value gradually as the overlapping degree gets larger.

3. The driving support apparatus according to claim 1, further comprising:
    a display controller that executes a display indicative of the vehicle speed currently being limited when the speed limiter sets the vehicle speed to be less than or equal to the maximum value.

4. The driving support apparatus according to claim 1, wherein the overlapping degree identifier identifies a degree of an overlapping area between the vehicle and the parking space based on the captured image and the parking space identified by the parking space identifier.

5. The driving support apparatus according to claim 1, wherein the overlapping degree identifier identifies a degree of a length of the vehicle in a front-back direction at a part where the vehicle and the parking space are overlapped to each other, as the overlapping degree.

6. The driving support apparatus according to claim 1, further comprising:
    a departure detector, which detects that the vehicle departs from parking,
    wherein the overlapping degree identifier and the speed limiter start processing when the departure detector detects that the vehicle departs from the parking.

7. The driving support apparatus according to claim 6, wherein the parking space identifier starts processing when the departure detector detects that the vehicle departs from the parking.

8. The driving support apparatus according to claim 6, further comprising:
    a storage device that stores a parking space identified by the parking space identifier when the vehicle performs a parking process,
    wherein the overlapping degree identifier identifies an overlapping degree of the vehicle towards the parking space based on the parking space stored in the storage device when the departure detector detects that the vehicle departs from the parking.

9. The driving support apparatus according to claim 1, further comprising:
    a parking start detector, which detects that the vehicle starts a parking process,
    wherein the overlapping degree identifier and the speed limiter starts processing when the parking start detector detects that the vehicle starts the parking process.

* * * * *